United States Patent [19]

Houis et al.

[11] Patent Number: 5,356,679
[45] Date of Patent: Oct. 18, 1994

[54] PIPE SURFACE COATING WITH CONVERSION AND THERMOSETTING RESIN LAYER, AND PROCESS FOR THE COATING APPLICATION

[75] Inventors: Gerard Houis, Nancy; Jean-Marc Pedeutour, Blenod les Pont-a-Mousson, both of France

[73] Assignee: Pont-A-Mousson S.A., Nancy, France

[21] Appl. No.: 985,337

[22] Filed: Dec. 4, 1992

[30] Foreign Application Priority Data

Dec. 24, 1991 [FR] France .................. 91 16343

[51] Int. Cl.⁵ ............... B29D 22/00; B29D 23/00; B32B 1/08
[52] U.S. Cl. .................. 428/35.9; 138/143; 138/146; 148/258; 148/262; 204/181.1; 204/181.3; 427/410; 428/36.91; 428/935
[58] Field of Search .......... 204/181.1, 181.3; 427/407.1, 409, 410, 412.1; 138/143, 146; 428/35.9, 36.9, 36.91, 935; 148/258, 262

[56] References Cited

U.S. PATENT DOCUMENTS

| | | | |
|---|---|---|---|
| 4,165,242 | 8/1979 | Kelly et al. | 427/409 X |
| 4,636,264 | 1/1987 | Schellenberg et al. | 427/435 X |
| 4,756,975 | 7/1988 | Fujii et al. | 204/181.3 X |
| 4,786,339 | 11/1988 | Meyer et al. | 138/146 X |
| 4,853,297 | 8/1989 | Takahashi et al. | 138/146 X |
| 5,075,378 | 12/1991 | Smierciak et al. | 525/121 X |

FOREIGN PATENT DOCUMENTS

| | | |
|---|---|---|
| 78866 | 4/1988 | Australia . |
| 3508811 | 9/1986 | Fed. Rep. of Germany . |
| 3513207 | 10/1986 | Fed. Rep. of Germany . |
| 2205171 | 5/1974 | France . |
| 2212909 | 7/1974 | France . |
| 2370918 | 6/1978 | France . |

OTHER PUBLICATIONS

*Electroplating; Electroforming*, p. 3, Week C10, 17368C/10 * J5 5011-175.
Derwent Abstract No. 85-040992.

Primary Examiner—Michael Lusignan
Attorney, Agent, or Firm—Sughrue, Mion, Zinn, Macpeak & Seas

[57] ABSTRACT

A multilayer pipe surface coating for water system elements requiring high corrosion resistance includes at least one conversion layer and one thermosetting synthetic resin layer.

17 Claims, 1 Drawing Sheet

PIPE SURFACE COATING WITH CONVERSION AND THERMOSETTING RESIN LAYER, AND PROCESS FOR THE COATING APPLICATION

BACKGROUND OF THE INVENTION

This invention concerns a multilayer anti-corrosive coating for the entire surface of a ferrous metal element, such as a water system pipe.

Petroleum bitumen-based coatings are known and used as internal and external coatings for water system elements. These coatings are low-cost but require the use of solvents, which increases the risk of fire.

In other known coatings, all the layers are obtained from epoxy powder-based compositions, which offer good corrosion resistance. But the thickness of such coatings varies, especially at the joints where the elements are dimensioned to fit together for assembly (seal grooves, centering diameters), thereby making it necessary either to increase the number of foundry models with different dimensions for the different coatings, or to machine down the metal elements prior to coating.

These coatings consist of inert material forming a barrier against external elements. This barrier, however thick it may be, is still subject to impact damage that will bare the substrate, at which point protection no longer exists, without involving any chemical reactions between the coating and its substrate. This is true of both petroleum bitumen and epoxy powder. In order for this protection to have maximum effectiveness, it is important that the bitumen or epoxy be free of damage down to the metal.

If these conditions are not met, corrosion sets up electrical macrocells due to damage from transverse impacts, cracks, and separations which, by locally depassivating the iron by lowering the pH and allowing depassivating substances to enter, will localize isolated anodic sites within the cathodic areas, which are the passivated surfaces where the coating still remains in intimate contact with the metallic structure. From that point on, as the ratio of the cathodic surface area to the anodic surface area is generally large, the current flowing in these macrocells may be high whenever any active depolarization of the cathodic area is possible.

SUMMARY OF THE INVENTION

The present invention aims to remedy these disadvantages and to provide a low-cost coating covering the entire internal and external surface of a metal water system element, with an automated application process.

In the invention, the metal element with its coating must exhibit good resistance to corrosion from acid or basic soils such as, for example, calcareous, clayey soils or soils bearing sweet or salt water tables. The coated element must also stand up to corrosive attack by the different kinds of water that may be transported by the element such as, for example, drinking water, treated water, wastewater or rainwater. The coated element must not give off toxic products, or any that will discolor the water or alter its taste or smell.

To achieve low manufacturing cost, the coating must follow the functional form of the metal element, such as its grooves and flanges, without requiring touchup after the coating is applied. The coating should allow material to be saved, by avoiding surplus application such as by running and excess thickness, and the coated element must also stand up to corrosion by the air, to which it is subject during storage and shipment, prior to installation. Air corrosion is linked to variations in the temperature and humidity of the atmosphere. This results in a general attack on the entire surface of a metal element, unlike corrosion by the soil, which consists, among other things, of localized pile effects as explained above.

Finally, the element according to the invention must not exhibit any accumulation of corrosion macrocells and must offer good impact resistance to the damage that gives rise to the macrocells.

To do so, the multilayer coating for the entire surface of a ferrous metal water system element includes, building from the metal element outward, at least one conversion coat and one thermosetting synthetic resin coat of constant thickness. In one variant, the conversion coat is passivated.

Furthermore, it has been discovered that such a coating exhibits very effective corrosion resistance if the conversion layer of the coating consists of a combined zinc and iron phosphate.

In accordance with other characteristics or variants of the coating:
the passivation is chromic or organic,
the organic products of the passivation include tannic acid,
the thermosetting synthetic resin is an epoxy, and
it includes an additional layer of thermosetting synthetic resin covering the first layer thereof.

The invention also relates to a process for applying a coating as described above over the entire surface of a ferrous metal element. The process includes at least the following phases, in succession:
a chemical conversion bath,
rinsing with demineralized water,
electrodeposition in a bath including a synthetic resin in an aqueous medium, and
curing of the synthetic resin.

Other variants and characteristics of the process exist, with the following differences:
Between the rinsing with demineralized water and the electrodeposition, a passivation bath is added, followed by another rinsing with demineralized water.
The electrodeposition bath liquid can be enriched in synthetic resin by ultrafiltration.
An extra outer coat of synthetic resin can be added to the metal element.
This additional coat of synthetic resin is applied by electrostatic dusting, on cold or hot metal elements, by electrostatic spray, by immersion in a fluidized bath, by electrophoresis followed by a curing, or by spraying the two components of a liquid synthetic resin.

Another object of the invention is the application of the coating to the entire surface of a water system pipe or like element, consisting of a carbon alloy of a ferrous base metal, the metal element being of irregular shape, capable of transporting water, and being in contact with soils.

DETAILED DESCRIPTION OF THE PREFERRED EMBODIMENTS

Figure 1:
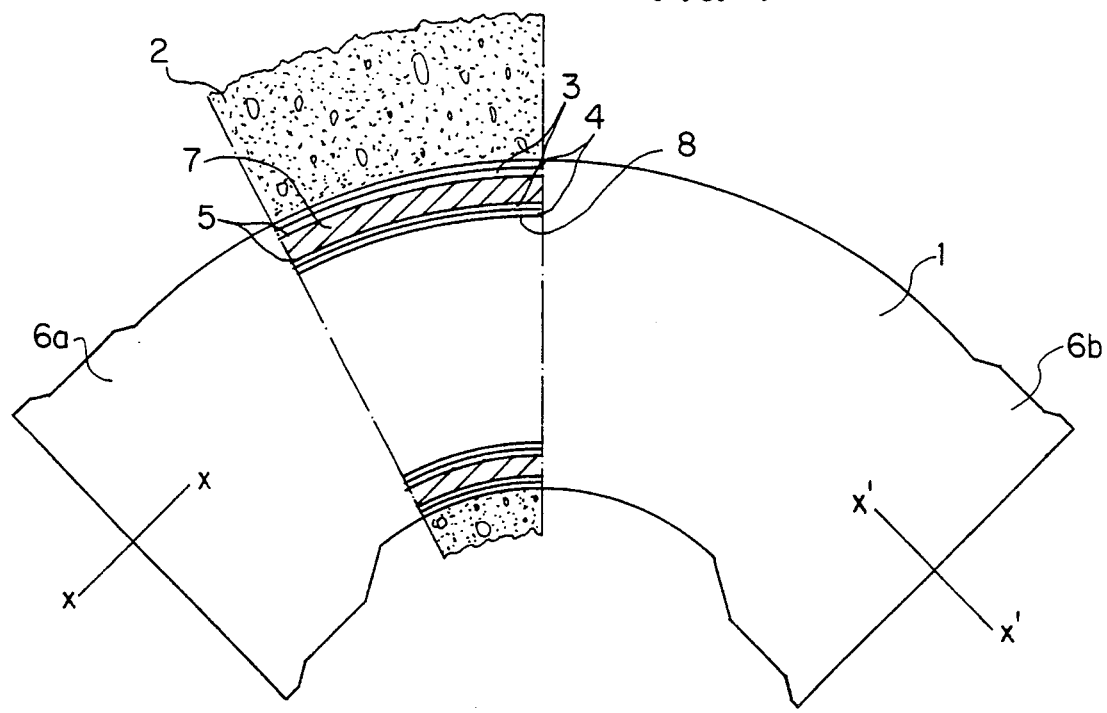
FIG. 1 is an elevation drawing with partial cutaway of a pipe element with a multilayer coating in accordance with the invention.

A rough-cast ferrous metal element 1, illustrated as a pipe system elbow in FIG. 1, is installed in earth or soil 2. It is covered with a multilayer coating 5 including, in contact with the metal element, a conversion layer 3 covered with a layer of thermosetting synthetic resin 4. The thickness of each of the layers is constant and follows the original form or shape of the element 1, which is thus preserved at the surface of the coating 5. The shape of the element 1 is complex, as it has a bend and is connected to other water system piping elements, which are not illustrated. Each joint with the other water system elements is a jam fit, 6a or 6b. Each of these joints 6a or 6b (as disclosed, ex., in commonly assigned French patent application FR-A-2,647,520) has a coaxial groove at its inlet end, followed by a flange. The groove consists of a slightly tapered conical face that continues to the bottom of the joint 6a or 6b, or a cylindrical surface of constant diameter, terminated in the internal radial direction by a flat or slightly tapered surface, perpendicular to the line X—X or X'—X'. This flat surface is extended toward the bottom of joint 6a or 6b by a convex curve and by a truncated conical surface that fits at last with a cylindrical surface of a diameter less than that of the cylindrical surface of the groove of joint 6a or 6b. The tapered surface is conical outward toward the bottom of the joint, such that the inner surface of the joint 6a or 6b can be fitted with a packing seal. The cylindrical surface ends at the bottom of the joint with a radial stop that limits the length of the cylindrical surface.

The metal element i is produced with the desired configuration of its end joints by foundry casting, and the coating 5 is then applied to the entire surface of the ferrous metal element, i.e. its external and internal faces 7 and 8, respectively. This application is performed by subjecting the element to a chemical conversion bath, followed by rinsing in demineralized water, a passivation bath, rinsing in demineralized water, and finally by electrodeposition in a bath including a synthetic resin in an aqueous medium.

The electrodeposition bath is further rinsed by ultra-filtration.

Considering that the particular shape of element 1 has been maintained, it is not necessary to perform any touchup operations on the element after it is coated.

The purpose of the invention is to:
  apply a coating 5 in conformity with the one described above, covering the entire internal and external surfaces of a cast element for transporting drinking water, and/or
  apply a coating 5 in conformity with the one described above, to cast iron parts.

Figure 2:
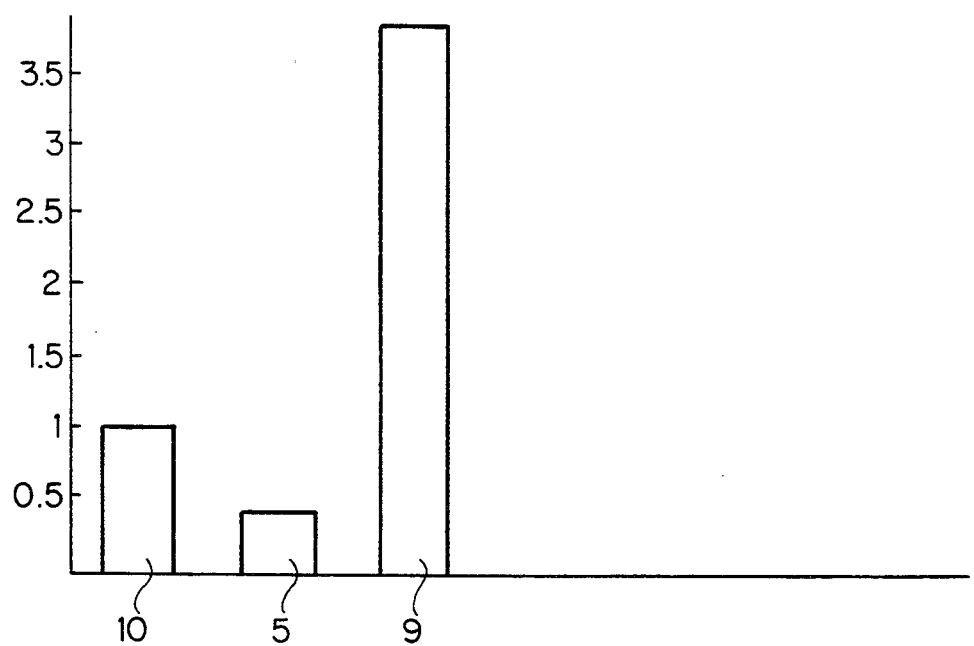
FIG. 2 is a histogram of test results showing the consumption, over time, of a coating according to the invention, compared with that of other coatings on the entire surface of a water system element.

FIG. 2 shows a histogram of test results on different coatings: one coating 9 of petroleum bitumen base; and a coating 10 obtained from an epoxy powder base compound. These known coatings 9 and 10 are compared with a coating 5 according to the invention, in which the conversion coat consists of a combined zinc and iron phosphate.

The tests consisted of simulating damage passing through the coatings 5, 9, 10 in a medium of low resistivity (100Ω×cm), creating an electrochemical couple constituting a macrocell as described above. This simulation was performed on a sample cut out of a coated metal element.

A cylindrical anode of the same kind as the metal element was placed inside the sample. The anode was encased in a sheath of electrical insulation from which only one of the end disks protruded. The anode was connected to the sample by an electrical connection including a microammeter.

The objective was to compare how much anode metal is consumed after 200 days in a medium having a resistivity of 100Ω×cm, for the three types of coatings. The metal consumed is represented in the histogram ordinate in millimeters per year.

These tests in the medium of 100 Ω×cm resistivity are also presented in the following table which compares the coating according to the invention with a bitumen-base coating, over intervals of 100, 158 and 200 days, and with an epoxy-base coating applied by dusting on cold parts, for an interval of 200 days. The anode metal consumption was calculated as a function of the current flow (level of attack).

The results are brought together in Table 1 below.

TABLE 1

| | Medium of 100 Ω × cm resistivity | | | |
|---|---|---|---|---|
| Reference | Current ($\mu$A) | Current ($\mu$A) | Current ($\mu$A) | Level of attack |
| Bitumen-base coating | 83 | 72 | 60 | 3.9 |
| Epoxy coating dusted on cold pieces | | | 15.4 | 1.0 |
| Coating according to the invention | 5.6 | 7.3 | 8.3 | 0.44 |

These three coatings were also compared in a less aggressive environment, over intervals of 100, 158 and 200 days, and the anode metal consumed was calculated as a function of the current flow (level of attack).

The results are summarized in Table 2 below.

TABLE 2

| | Medium of 1500 Ω × cm resistivity | | | |
|---|---|---|---|---|
| Reference | Current ($\mu$A) at 100 days | Current ($\mu$A) at 158 days | Current ($\mu$A) at 200 days | Level of attack (mm/year) (base 200 days) |
| Bitumen-base coating | 70 | 53 | 43 | 2.8 |
| Epoxy coating dusted on cold pieces | | | 9.8 | 0.64 |
| Coating according to the invention | 2.8 | 2.8 | 3.4 | 0.22 |

Measurements were also made of the variation of the corrosion current, as determined from Tafel graphs (in $\mu$A/cm$^2$) for the coating according to the invention and another coating without an underlying chemical conversion layer. The tests lasted one to four days, 30 days and 145 days.

The results are given in Table 3 below.

TABLE 3

| | 1 to 4 days | 30 days | 145 days |
|---|---|---|---|
| Thermosetting resin-base coating without chemical conversion layer | 170 | 135 | 430 |
| Coating according | 28 | 14 | 90 |

TABLE 3-continued

|  | 1 to 4 days | 30 days | 145 days |
|---|---|---|---|
| to the invention | | | |

We claim:

1. A multilayer coated ferrous metal element of a water system pipe comprising a ferrous metal element of a water system pipe coated on its entire inner and outer surface with a multilayer coating comprising from the metal element surface outward, a conversion layer, and a thermosetting synthetic resin layer of constant thickness.

2. The element of claim 1, wherein the conversion layer has been passivated.

3. The element of claim 1, wherein the conversion layer comprises a combined zinc and iron phosphate.

4. The element of claim 2, wherein the passivation is chromic.

5. The element of claim 2, wherein the passivation is organic.

6. The element of claim 5, wherein organic products of the passivation include tannic acid.

7. The element of claim 1, wherein the thermosetting synthetic resin is an epoxy.

8. The element of claim 1, including an additional, outermost layer of thermosetting synthetic resin covering a first layer of thermosetting synthetic resin.

9. The coating of claim 1, wherein the water system pipe comprises a carbon alloy of iron, has an irregular shape, and is intended to be installed in contact with soil.

10. The coating of claim 1, for covering the entire inner and outer surface of a cast metal element for a drinking water supply system.

11. A process for applying a coating to the entire inner and outer surface of a ferrous metal element of a water system pipe, said element comprising, from the metal element surface outward, a conversion layer, and a thermosetting synthetic resin layer of constant thickness, said process comprising the successive steps of:

subjecting the element to a chemical conversion bath, rinsing the element in demineralized water,
subjecting the element to electrodeposition in a bath including a synthetic resin in an aqueous medium, and
curing the synthetic resin.

12. The process of claim 11, wherein the metal element is covered by an additional outer coat of synthetic resin.

13. The process of claim 12, wherein the additional coat is dusted on by electrostatic spray or immersion in a fluidized bath followed by curing.

14. The process of claim 12, wherein the two components of a liquid synthetic resin are sprayed on the element simultaneously.

15. The process of claim 12, wherein the additional coat is applied by electrophoresis, followed by curing.

16. The process of claim 11, including, between the steps of rinsing in demineralized water and electrodeposition, the following additional steps:

subjecting the element to a passivation bath, and rinsing the element in demineralized water.

17. The process of claim 11, wherein the electrodeposition bath is enriched in synthetic resin by ultrafiltration.

* * * * *